US010686839B2

(12) United States Patent
Xie et al.

(10) Patent No.: US 10,686,839 B2
(45) Date of Patent: *Jun. 16, 2020

(54) BUILDING A COOPERATIVE SECURITY FABRIC OF HIERARCHICALLY INTERCONNECTED NETWORK SECURITY DEVICES

(71) Applicant: Fortinet, Inc., Sunnyvale, CA (US)

(72) Inventors: Michael Xie, Palo Alto, CA (US); Robert A. May, North Vancouver (CA); Xiadong Xu, Surrey (CA); Yong Wang, Surrey (CA); Jordan E. Thompson, Vancouver (CA); Shenghe Wang, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/855,230

(22) Filed: Dec. 27, 2017

(65) Prior Publication Data

US 2018/0324217 A1    Nov. 8, 2018

Related U.S. Application Data

(60) Provisional application No. 62/503,252, filed on May 8, 2017.

(51) Int. Cl.
*H04L 29/06* (2006.01)
*H04L 12/24* (2006.01)
*H04W 24/02* (2009.01)

(52) U.S. Cl.
CPC .............. *H04L 63/20* (2013.01); *H04L 41/12* (2013.01); *H04L 63/0236* (2013.01);
(Continued)

(58) Field of Classification Search
CPC . H04L 63/1441; H04L 63/08; H04L 63/0209; H04L 63/0236; H04L 63/0263;
(Continued)

(56) References Cited

U.S. PATENT DOCUMENTS

2012/0297042 A1* 11/2012 Davis .................... H04L 45/60
                                                         709/223
2014/0254592 A1*  9/2014 Olofsson ............. H04L 12/1863
                                                         370/390
(Continued)

OTHER PUBLICATIONS

Exposing the network: support for topology-sensitive applications Y Chae, S Merugu, EW Zegura . . . — . . . and Network . . . , 2000—ieeexplore.ieee.org (Year: 2000).*

(Continued)

*Primary Examiner* — Alexander Lagor
*Assistant Examiner* — Vu V Tran
(74) *Attorney, Agent, or Firm* — Jaffery Watson Mendonsa & Hamilton, LLP

(57) ABSTRACT

Systems and methods for implementing a cooperative security fabric (CSF) protocol are provided. According to one embodiment, a CSF of multiple network security devices (NSDs) deployed within a protected network is constructed in a form of a tree, having a root node, one or more intermediate nodes and one or more leaf nodes, based on hierarchical interconnections among the NSDs by determining a relative upstream or downstream relationship among each NSD. Backend daemons of the NSDs establish and maintain a bi-directional tunnel between each parent node within the CSF and its respective child nodes through which queries and replies are communicated and through which periodic keep-alive messages and responses are exchanged. Forward daemons of the NSDs enforce a CSF protocol that limits the issuance of query messages to those originated by (Continued)

an upstream node within the CSF and directed to a downstream node within the CSF.

23 Claims, 7 Drawing Sheets

(52) U.S. Cl.
    CPC .......... *H04L 63/0263* (2013.01); *H04L 63/08* (2013.01); *H04L 63/1408* (2013.01); *H04L 63/1441* (2013.01); *H04W 24/02* (2013.01)

(58) Field of Classification Search
    CPC . H04L 63/1433; H04L 63/1408; H04L 63/20; H04L 41/12; H04W 24/02; H04W 12/06
    See application file for complete search history.

(56) References Cited

U.S. PATENT DOCUMENTS

2018/0027006 A1* 1/2018 Zimmermann ..... H04L 63/0227
                                                        726/11
2018/0063082 A1* 3/2018 Nenov ................ H04L 63/0236

OTHER PUBLICATIONS

U.S. Appl. No. 15/938,629, filed Mar. 28, 2018.
U.S. Appl. No. 15/855,897, filed Dec. 27, 2017.

* cited by examiner

BUILDING A COOPERATIVE SECURITY FABRIC OF HIERARCHICALLY INTERCONNECTED NETWORK SECURITY DEVICES

CROSS-REFERENCE TO RELATED PATENTS

This application claims the benefit of priority of U.S. Provisional Application No. 62/503,252, filed on May 8, 2017, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright©2017, Fortinet, Inc.

BACKGROUND

Field

Embodiments of the present invention generally relate to network security devices and network management devices. In particular, embodiments of the present invention relates to systems and methods for construction, management and use of a cooperative security fabric formed by hierarchically interconnected network security devices deployed within a protected network.

Description of the Related Art

A typical enterprise or data center network includes, among other network devices and servers, multiple network security devices implementing various security-related functions, including, but not limited to, intrusion detection, intrusion prevention, content filtering, anti-malware, antispam, Virtual Private Networking (VPN) capabilities, network traffic/event logging, identity-based access control, Data Leak Prevention (DLP), load balancing, Quality of Service (QoS), SSL/SSH inspection and application control. While security management appliances, such as the FORTIMANAGER security management appliance (available from Fortinet, Inc. of Sunnyvale, Calif.), exist that allow a network administrator to configure, provision and/or manage a large number of network security devices, global resource optimizations relating to firewall policy optimization and/or logging optimization, for example, require full information regarding the network topology, including the interconnections (e.g., upstream and downstream relationships) among the managed network security devices.

SUMMARY

Systems and methods are described for implementing a cooperative security fabric (CSF) protocol. According to one embodiment, a CSF of multiple network security devices deployed within a protected network is constructed in a form of a tree, having multiple nodes, including a root node, one or more intermediate nodes and one or more leaf nodes, based on hierarchical interconnections among the network security devices by determining a relative upstream or downstream relationship among each network security device. Each node of the CSF represents a network security device and each node of the CSF, except the root node and the one or more leaf nodes, includes both a parent node and one or more child nodes. Backend daemons of the network security devices establish and maintain a bi-directional tunnel between each parent node within the CSF and its respective child nodes through which queries and replies are communicated and through which periodic keep-alive messages and responses are exchanged. Forward daemons of the network security devices enforce a CSF protocol that limits the issuance of query messages to those originated by a source network security device associated with an upstream node within the CSF and directed to a destination network security device associated with a downstream node within the CSF.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
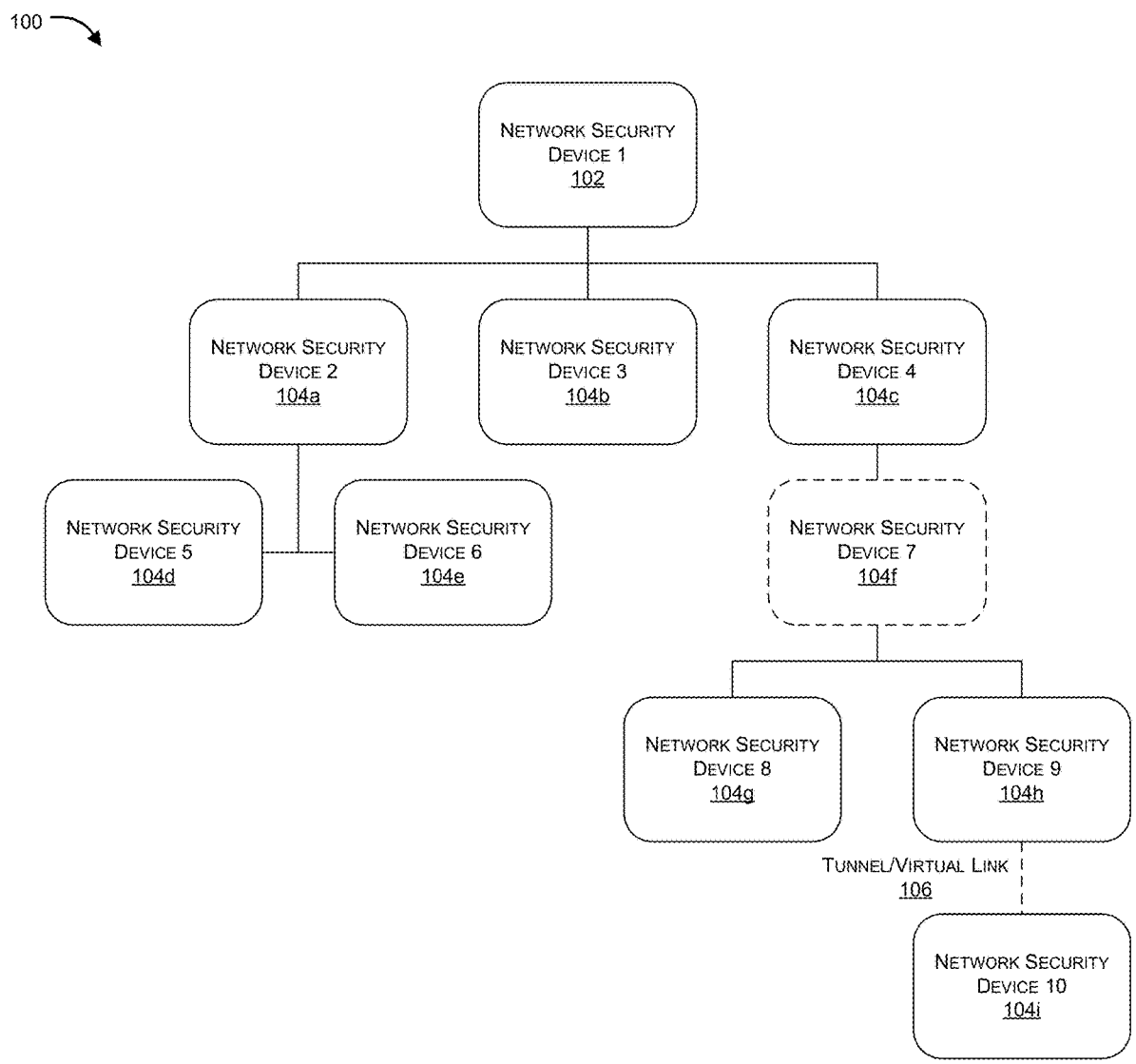
FIG. 1 illustrates an exemplary cooperative security fabric (CSF) created in accordance with an embodiment of the present invention.

Systems and methods are described for a cooperative security fabric (CSF) protocol that facilitates the dynamic formation of a CSF among multiple network security devices within a private network based on hierarchical interconnections among the network security devices. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Systems and methods are described for dynamically forming a cooperative security fabric (CSF) based on hierarchical interconnections among network security devices within a network. Systems and methods are disclosed for network security devices to form a cooperative security fabric (CSF), which can be used to obtain desired information regarding network topology and to efficiently devise and implement resource optimizations for participating network security devices.

In an aspect, the present disclosure relates to a system comprising a cooperative security fabric (CSF) construction module configured to dynamically construct a CSF based on hierarchical interconnections among multiple network security devices deployed within a protected network by determining a relative position of each of the network security devices within the CSF based on an identifier associated with the respective network security devices, wherein each node of the CSF represents a network security device of the multiple network security devices and each node of the CSF, except a root node of the CSF and leaf nodes of the CSF, has one parent node and one or more child nodes. In one embodiment, the CSF protocol limits issuance of a query by an originating node to a downstream node (i.e., a child node or a lower level node in the hierarchy of the CSF that is connected to a child node). In such an embodiment, a downstream node would not be permitted to query an upstream node (e.g., a parent node or a higher level node in the hierarchy of the CSF) or a node at the same hierarchical level within the CSF.

The system of the present disclosure further includes a tunnel based communication module configured to enable communication of periodic keep-alive messages and on-demand query messages among parent nodes and their respective child nodes by establishing, using a backend daemon running on the network security devices, a tunnel between the parent nodes and each of their child nodes, if any.

In an aspect, the network security devices can be selected from one or a combination of gateway devices, firewall devices, Intrusion Detection Systems (IDSs), Intrusion Prevention Systems (IPSs), and Unified Threat Management (UTM) devices. In one embodiment, each network security device of the multiple network security devices participating in the CSF is aware of only those of the network security devices that are directly connected to it, including its parent and its children.

In another aspect, only the root node network security device is aware of the complete topology of the CSF by means of one of its local daemons. The system of the present disclosure can further be configured to enable a particular network security device to issue a query to a downstream destination network security device using the forward daemon. In embodiments of the present invention queries may be used to, among other things, gather topology information regarding the subtrees of downstream nodes, gather information regarding the identity (e.g., IP address, MAC address and/or serial number) of each downstream NSD, including its type, functionality, capabilities, configuration, status, performance, resources and tunnel/virtual links.

In one embodiment, queries include a whole path and query data, wherein the whole path can include at least one unique attribute (e.g., IP address, MAC address and/or serial number) of each intermediate network security device between the particular network security device and the downstream destination network security device that the query should pass through. When the query is received at the downstream destination network security device, the query data can be processed by the downstream destination network security device to obtain a response that is proxied back to the particular network security device.

In an aspect, the tunnel established between each parent network security device and child network security device is bidirectional, thereby allowing for communication of downstream query messages, upstream responses, keep-alive messages and corresponding responses through the same tunnel. In yet another aspect, a network security device can perform resource optimization for its downstream network security devices. In yet another aspect, a new network security device intending to join the CSF can provide authentication information along with an identifier of its parent network security device, and wherein upon successful authentication of the new network security device, the new network security device is made part of the CSF and added below the parent network security device. On the other hand, when a child network security device leaves CSF 100, the child network security device may simply close the connection or disconnect directly to enable the parent NSD to remove the child NSD based on a timer.

Those skilled in the art will appreciate that the proposed system does not require election of a master network security device for performing optimization and other network security/management functions as the root node network security device (i.e., the network security device within the CSF that does not have a parent node) can be recognized as the master network security device by default. The system can further enable the root network security device to be fully aware of the entire network topology, and each network security device can be aware of the topology of downstream network security devices attached thereto, enabling any particular network security device to perform resource optimization for downstream network security devices. In alternative embodiments, each NSD participating in CSF 100 may be provided with full information regarding CSF 100 and the NSDs may perform an election process to select a master NSD.

FIG. 1 illustrates an exemplary cooperative security fabric (CSF) 100 created in accordance with an embodiment of the present invention. In the simplified example illustrated by FIG. 1, CSF 100 includes one root node network security device (NSD), which may also be referred to interchangeably as the master network security device or root node, multiple intermediate node NSDs (i.e., NSD 2 104a, NSD 4 104c, NSD 7 104f, and NSD 9) 104h, and multiple leaf node NSDs (i.e., NSD 3 104b, NSD 5 104d, NSD 6 104e, NSD 8 104q, and NSD 10 104i). Each intermediate node NDS of CSF 100 may be aware of downstream network topology, along with being aware of its connected downstream network security devices, and its parent node. For instance, NSD 102 would be aware of the entire network topology, whereas NSD 2 104a would only be aware of its downstream nodes—NSD 5 104d and NDS 6 104e—and its parent, NDS 1 102.

According to one emboidment CSF 100 can be dynamically constructed and maintained in a recursive way based on the downstream-upstream relationships defined by the hierarchical interconnection of the network security devices within the private network. For example, NSD 1 102, having no parent, may initially represent a CSF containing only one member. The other NSDs 104a-i, having one or more upstream NSDs, may join the CSF to which its parent belongs as described further below. Once CSF 100 stabilizes, the root node, i.e., NSD 1 102, has full information regarding CSF 100.

As noted above, NSDs participating within CSF 100 are permitted to issue queries to downstream NSDs participating within CSF 100. As such, NSD 2 104a may issue a query to either or both of NSD 5 104d and NSD 6 104e. In one embodiment, however, the CSF protocol precludes participating NSDs from issuing queries to upstream NSDs or NSDs that are not downstream from the NSD at issue. For example, in an embodiment in which such limitations are enforced by the CSF protocol, NSD 2 104a would not be permitted to issue a query to any of NSD 1 102, NSD 3 104b, NSD 4 104c, NSD 7 104f, NSD 8 104g, NSD 9 104h and NSD 10 104i.

As shown in FIG. 1, network security device 1 102, being the root note of the CSF 100, does not have a parent node and can be recognized as the master network security device within CSF 100. Nodes within CSF 100 can distinguish between being a leaf node and a root node in a number of ways, including whether they are directly coupled to more than one other node and whether they have a direct WAN connection. In addition to the permissible actions allowed to be performed by upstream network security devices (e.g., performing resource optimization for a downstream network security device and/or management of a downstream network security device), the master network security device has knowledge of the entire topology of the private network (not shown) within which CSF 100 is formed.

In an exemplary implementation, CSF 100 can be built in such a manner that each node of CSF 100 can request information regarding its downstream nodes and can send a query that may include an address of the destination node, a path to be followed from the source node (i.e., the node from which the query is originated) to the destination node, and query data. As those skilled in the art will appreciate, by making CSF 100, the root node, NSD 102, in the present example, becomes the master NSD and the other nodes in CSF 100 are fully aware of their respective downstream NSDs connected with them as well as their respective parent nodes. Each intermediate node NSD of the NST 100 may be aware of its parent NSD and child NSD(s). In the context of the present example, NSD 7 104 would be aware of its parent NSD 4 104c, and of its children NSD 8 104g and NSD 9 104h. In CSF 100, each node, except the root node NSD 102 and leaf nodes (i.e., NSDs 104d, 104e, 104b, 104g, and 104i), has one upstream node and one or more downstream nodes/NSDs. For instance, from the perspective of NSD 104a, NSD 102 represents an upstream node, and 104d and 104e represent downstream NSD nodes.

Each node of CSF 100 can be configured to be only aware of the nodes/NSDs directly connected with it. As those skilled in the art will appreciate, CSF 100 made in accordance with an embodiment of the present invention does not require election of a master NSD as the nodes/NSDs within CSF 100 that have a parent/upstream device recognize they are not the head/root/master of CSF 100 and the one node/NSD within CSF 100 that does not have a parent/upstream device recognizes itself as the head/root/master of CSF 100.

In an exemplary implementation, each node of CSF 100 may include one or more daemons, including a backend daemon and a forward daemon. In an exemplary implementation, the backend daemon running within a particular NSD can establish/create bidirectional tunnels between (i) the particular NSD and its parent, if any; and (ii) the particular NSD and each of its child nodes, if any. Further details regarding tunnel creation are described below with reference to FIG. 4. Each bidirectional tunnel can be configured to allow an upstream node/NSD to query a downstream node/NSD that it is connected to through the tunnel. Such a tunnel, in one exemplary configuration, can restrict the downstream node/NSD from sending queries to its upstream node/NSD. In general, when an upstream NSD queries a downstream NSD, the query is passed from the forward daemon of the upstream NSD (which may be referred to herein as an "uplevel daemon") to the backend daemon of an intermediate NSD, if any, (which may be referred to herein as a "downlevel daemon") and ultimately to the destination NSD. When the query reaches the destination NDS, the query is processed by the local backend daemon of the destination NSD. In this manner, queries may propagate downward toward the destination NSD in a recursive manner passing through the various intermediate uplevel and downlevel daemons as described further below. Similarly, responses to queries may propagate upward toward the originating NSD in a recursive manner passing through various intermediate downlevel and uplevel daemons.

For purposes of illustration, when node 104c queries node 104h, a first tunnel that has been created between node 104c and node 104f is initially used to pass the query from the forward daemon of node 104c to the backend daemon of node 104f. Then, the query is further passed from the forward daemon of NSD 104f to the backend daemon of NSD 104h via the tunnel established between NSD 104f and NSD 104h. Finally, at the destination (i.e., node 104f), the query is handled by local backend daemon.

In alternative embodiments, the communication channel between directly connected NSD can be implemented as two separate unidirectional tunnels, one for issuing commands, queries and/or keep-alive messages from an upstream node to a downstream node and one for returning responses to such commands, queries and/or keep-alive messages. Furthermore, while in the examples described herein, queries are described as flowing in a downstream direction, in some embodiments, downstream nodes may be allowed to query or update upstream nodes in one or more defined circumstances. For example, in one embodiment, responsive to accepting a join request from a new NSD, the NSD that has integrated the new NSD into its subtree may provide a topology update regarding its subtree to its parent via the tunnel connecting the two. In one embodiment, this topology update may be propagated all the way to the root of CSF 100.

In an exemplary implementation, the backend daemon running within each node of CSF 100 can be configured to create a tunnel or virtual link, for example, tunnel 106, between the upstream and downstream devices and handle one or more exceptions, if any. Backend daemon may also provide an Application Programming Interface (API), for example a Representational State Transfer (REST) or RESTful API, to the uplevel daemon to enable queries to be received and processed by the backend daemon. In an exemplary implementation, each node of CSF 100 may have a forward daemon that is configured to enable query initiation and response processing. The forward daemon can initiate a query, which may include a destination address, a complete path from the source node to the destination node, for example, indicating the addresses of all intermediate nodes through which the query is to pass, and query data. As described in further detail with reference to FIG. 3, each intermediate node, upon receiving a query, identifies whether the query is destined to it and, if so, can accordingly process the query; otherwise, the intermediate node can forward the query towards the destination node based on the path defined in the query.

The bidirectional tunnels represented by the connections between the nodes in CSF 100 may be established during construction of CSF 100. Alternatively, they may be established on demand. In an exemplary implementation, when a query is initiated by an uplevel daemon, the backend daemon of the source NSD can create the required tunnel between the source NSD and the next NSD, and similarly subsequent required tunnels can be created by other intermediate NSD(s) between themselves and their direct downstream NSD. When a query arrives at the destination node, the backend daemon of the destination node can send the query by making an appropriate call via the local RESTful API and wait for the response. The destination NSD can then generate a response, which can be proxied back to each upstream device until it reaches the source NSD. As those skilled in the art will appreciate, no path is required for a response as each node of CSF 100 can only have one parent. As such, a response can simply be propagated upstream until it reaches the source NSD that issued the corresponding query.

In an exemplary implementation, for a given tree such as CSF 100, a group name and password associated with CSF 100 can be used to allow a new NSD to join CSF 100 and authenticate itself to its parent. In order to join CSF 100, a new NSD may send a join request, including the group name and password to the Internet Protocol (IP) address of its parent. Responsive to receipt of the join request, the parent NSD verifies the group name and password, and upon successful verification, the backend daemon of the parent NSD may establish a bidirectional tunnel with the new NSD and update the subtree rooted at itself to include the new NSD. As described further below, the tunnel is used for periodic keep-alive messages between parent and child and for on-demand query messages from parent to child.

In one embodiment, rather than reporting a topology change upward through CSF 100 responsive to acceptance of a join request, upstream NSDs can request topology information associated with the subtree of a downstream NSD on demand, for example, responsive to a network administrator requesting a refresh of a graphical user interface presented by the root NSD. For instance, with respect to FIG. 1, a new NSD (not shown) can send a join request to become a part of CSF 100 to NSD 104b, which upon, authentication and verification, can add the new NSD as its child node. At a later time, responsive to a query by NSD 1 102 requesting topology information, NSD 3 104b can provide topology information regarding its subtree. Alternatively, information about integration of a new NSD can be passed up to a root node NSD, which can then broadcast the information to other NSDs participating in CSF 100.

In an exemplary implementation, root node NSD, for example NSD 102 of NST 100, can information regarding the entire topology of CSF 100 by sending a query requesting topology information regarding the subtrees of each of its children. Upstream NSDs can be aware of the identity of each NSD, its type, capabilities, resources etc. and tunnel/virtual links. Identity of each NSD, its type, capabilities, resources etc. and the tunnel/virtual links created between the NSDs can be transparent.

Figure 2:
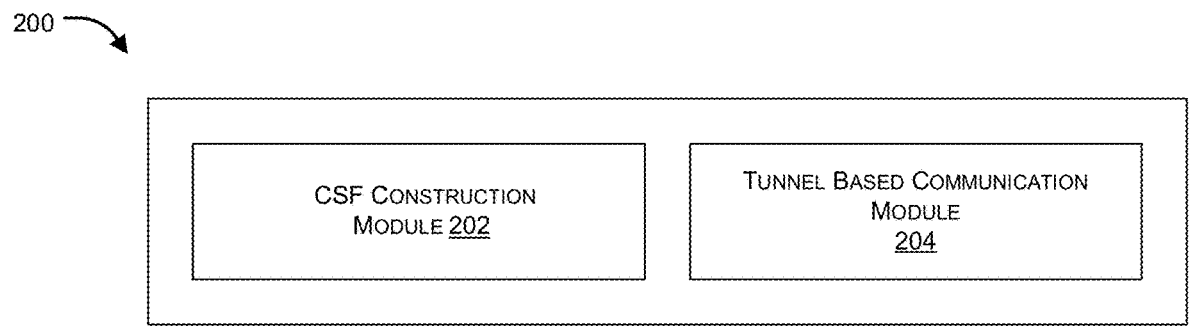
FIG. 2 illustrates exemplary functional modules of a network security device for dynamically forming a cooperative security fabric in accordance with an embodiment of the present invention.

FIG. 2 illustrates exemplary functional modules of a network security device (NSD) 200 for dynamically forming a CSF in accordance with an embodiment of the present invention. In this simplified example, NSD 200 may include a CSF construction module 202 and a tunnel based communication module 204, which together can be used by NSD 200 be used for dynamically forming a CSF (e.g., CSF 100) that can enable each NSD forming part of the CSF to be aware of the network topology of its downstream devices and enable resource optimization (e.g., firewall policy optimization and/or logging optimization) of downstream NSDs. Depending upon the particular implementation, NSD 200 may represent a gateway device, a firewall device, an Intrusion Detection System (IDS), an Intrusion Prevention Systems (IPS) and/or a Unified Threat Management (UTM) device.

Collectively, CSF construction module 202 of each of the NSDs within a private network dynamically constructs a CSF based on the hierarchical interconnections among them by determining its relative position as a root, intermediate or leaf node. As noted above, NSDs may send join requests to their parents to join the CSF in which their parents are participating. While the examples described herein may be described with reference to a single CSF within a private network, it is contemplated that network security devices may be divided into multiple CSFs and may participate in a single CSF or multiple CSFs.

Tunnel based communication module 204 establishes tunnels between NSD 200 and its parent, if any, and each of its children, if any. Tunnel based communication module 204 also enables communication of periodic keep-alive messages and on-demand query messages among parent nodes and their respective child nodes. As noted above, the tunnels may be established by a backend daemon (now shown) running on NSD 200 and NSD 200 may issue queries or commands to downlevel daemons via a forward daemon (not shown) running on NSD 200.

In an aspect, CSF construction module 202 can be configured to dynamically construct a CSF based on hierarchical interconnections among multiple network security devices deployed within a protected network. In another aspect, the CSF can be constructed by determining relative positions of each network security device within the CSF based on at least one identifier, such as an IP address, a type of NSD, the serial number of the NSD, a manufacturing year/date/time of the NSD, functionality of the NSD, location/position/configuration of the NSD in the network, importance of the NSD in the network, among other like parameters. Each network security device, except root node network security device and leaf-node network security devices, can be configured to have an single parent node and one or more child nodes, and each NSD of the CSF can be constrained to allow queries to be issued only in the downstream direction.

In an exemplary implementation, the at least one identifier that is associated with each NSD can be the IP address, type of NSD, hierarchy of NSD with respect to each other or with respect to OSI model, configuration/serial number/location of the NSD, among any other identifier attribute of the NSD.

In an aspect, tunnel based communication module 204 can be configured to establish, by a backend daemon running on NSD 200, a tunnel between a directly connected upstream network security device (not shown), if any, and each directly connected downstream NSD (not shown), if any.

Communication module 204 can further be configured to enable communication of periodic keep-alive messages and on-demand query messages among the upstream network security device and the one or more downstream network security devices of the particular node. In an exemplary implementation, each network security device participating in the CSF can be configured to be aware of only those of the network security devices that are directly connected to it. By limiting the awareness of the NSD devices in the CSF, better efficiency in term of network routing, security, and management can be achieved.

In another aspect, the proposed system can configure each NSD node in such a way that one or more downstream network security devices of a particular NSD of the NST cannot query the particular NSD (which is the upstream network security device for the downstream NSDs). The system can therefore configure each NSD so as to restrict an upstream NSD from being queried by a NSD that is lower in the CSF hierarchy.

In an exemplary implementation, the root node NSD can be aware of complete topology of the NST by means of one or more local daemons configured within each NSD. The root node NSD does not have any upstream NSD attached therewith, and similarly, leaf node NSDs do not have any downstream NSDs attached thereto. The root node NSD can act as master NSD, and can perform various network management and resource optimization functions in the network or in the CSF.

Figure 3:
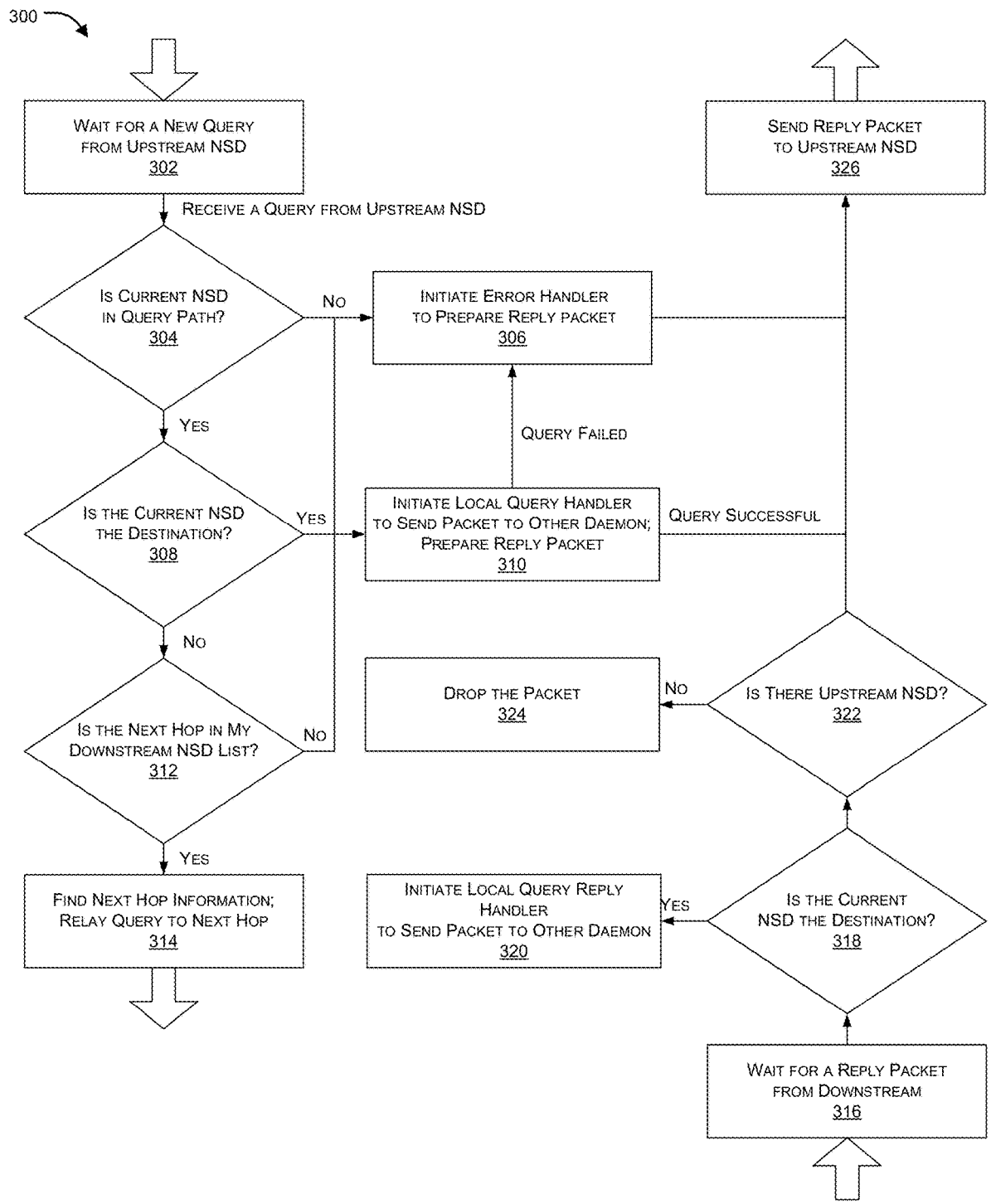
FIG. 3 is a flow diagram illustrating query handling by a network security device (NSD) in accordance with an embodiment of the present invention.

FIG. 3 illustrates an exemplary flow of query handling by an NSD of a CSF in accordance with an embodiment of the present invention. According to one embodiment, each NSD implements two separate daemons—one, the forward daemon, which, among other things, issues queries to downstream NSDs and receives and routes responses to queries received from downstream NSDs, and another, the backend daemon, which, among other things, receives and processes queries from upstream NSDs (via a RESTful API, for example). In an exemplary implementation, each NSD can be configured to handle query and response packets based on the content of the respective packet and the specified query or return path. In an exemplary implementation, the response packet can include the destination address (which is the same as the source address of query packet), a return path including addresses of intermediate node(s)/hop(s)/NSD(s) through which it needs to be routed, along with the response data. In an exemplary implementation, return path and the query path can be same or different. In an exemplary implementation, communication between upstream and downstream NSDs can be enabled through a tunnel created by the current NSD.

As shown in FIG. 3, a particular NSD can wait for a new query from an upstream NSD, as shown at block 302. When the particular NSD receives the query that has a defined query path indicating the identities of intermediate NSDs, the destination NSD(s), and query data, it can check whether the current/particular NSD is in the query path, as shown at decision block 304. When the particular NSD is in the query path, it can further determine whether the current NSD is the destination NSD, as shown at decision block 308.

When the particular NSD is not in the query path, an error handler can prepare a reply packet, as shown at block 306, and send the reply packet to the upstream NSD as shown at block step 326.

When the current NSD is the destination NSD, a local query handler can be instantiated to handle the query and to cause the local forward daemon to prepare and send the reply packet upstream to the originator of the query as shown at block 310, wherein the forward daemon can send the reply packet to the upstream NSD, as shown at block 326. When the current NSD determines that it is not the destination NSD, it can determine whether the next hop NSD in the query path is in its downstream NSD list, as shown at decision block step 312. When the current NSD determines that the next hop is in its downstream NSD list, it can find the next hop information and relay the query to the next hop/downstream NSD as shown at block 314; otherwise, an error handler is initiated to prepare a reply packet to be sent back to the upstream NSD as shown at block 306.

In an exemplary implementation, the current NSD can also be configured to process response/reply packets received from a downstream NSD and make forwarding decisions to forward the responses/replies to an upstream NSD. As shown at block 316, the current NSD can wait for a reply packet to be received from a downstream NSD connected to it, determine whether the current NSD is the destination NSD for the received response, as shown at decision block 318. When the current NSD is the destination NSD, a local query reply hander can be initiated to send the packet to the other daemon—the uplevel daemon—that is responsible for taking an appropriate action as shown at block 320; otherwise, the current NSD can determine whether there is an upstream NSD connected with the current NSD as shown at decision block 322. When the current NSD does not have an upstream NSD connected thereto, it can drop the response packet as shown at block 324; otherwise, it can send the response/reply packet to the upstream NSD as shown at block 326.

Figure 4:
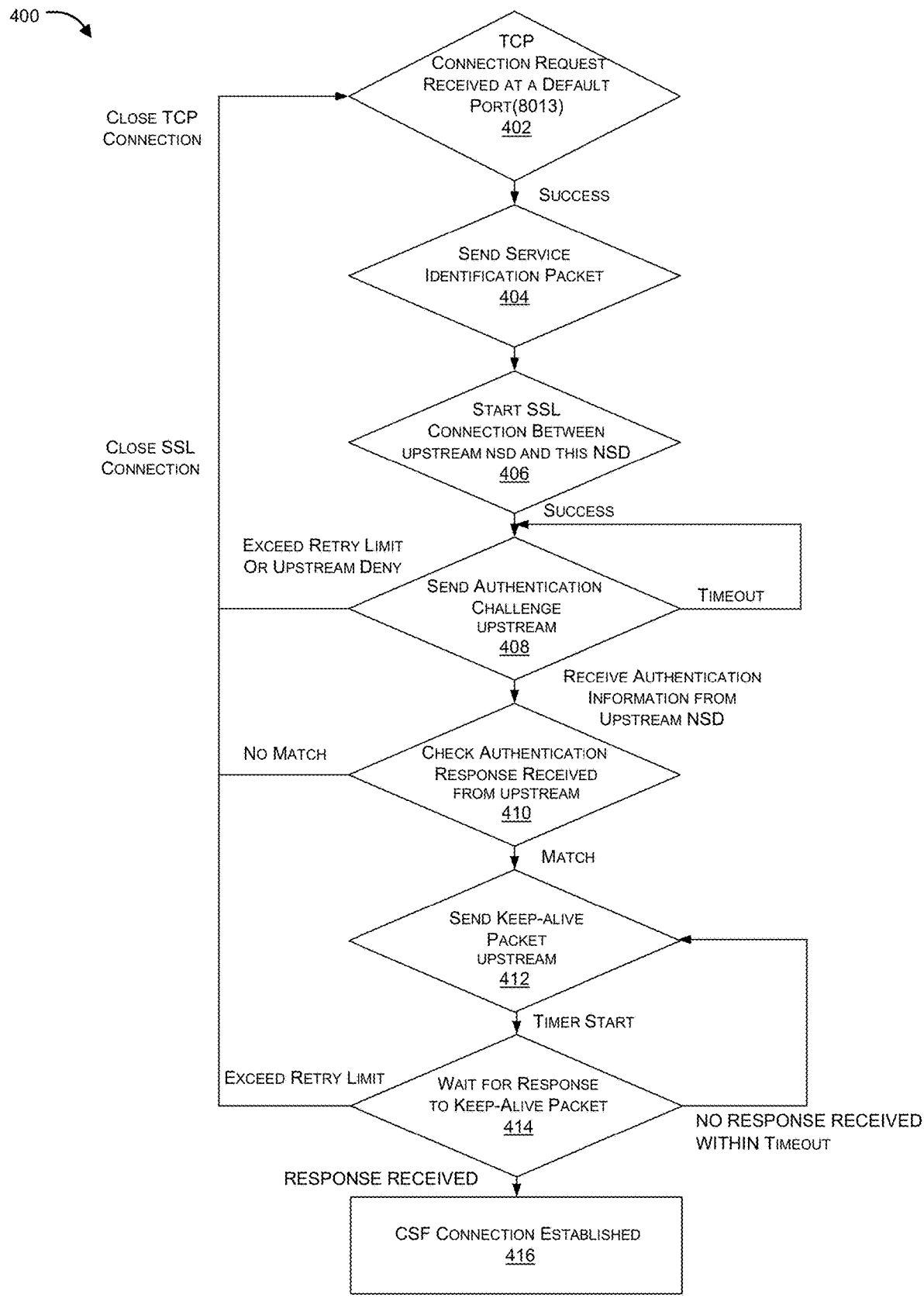
FIG. 4 is a flow diagram illustrating a downstream view of tunnel creation between two network security devices (NSDs) by a backend daemon in accordance with an embodiment of the present invention.

FIG. 4 illustrates an exemplary downstream view of tunnel creation between two NSDs by a backend daemon in accordance with an embodiment of the present invention. As shown in FIG. 4, an NSD can be configured to listen for a Transmission Control Protocol (TCP) client connection request on a default port, for example port 8013, as shown at decision block 402, and send a service identification packet, as shown at block 404. In an exemplary implementation, the TCP client connection request may be generated by the uplevel daemon of the NSD or by a stream NSD. On successful identification of the service and compatibility of the network, the NSD can start a Secure Sockets Layer (SSL) client connection, as shown at block 406 between the NSD and the TCP client, which can be a new NSD or an upstream NSD. The NSD can send an authentication challenge to the TCP client, and wait for the TCP client to provide authentication details (for instance, including a group name for the CSF and a corresponding password), as shown at block 408. If the TCP client does not respond to the authentication challenge within a predefined timeout period associated with the authentication challenge, a timeout can occur and the NSD can resend the authentication challenge to the TCP client. When the NSD does not receive a response or the authentication response is not accurate after the retry limit has been exceeded, the NSD can close the SSL connection between the TCP client and the NSD and close the TCP connection request. When the authentication response is received from the client device, the NSD can check authentication information received from the client device to verify authenticity of the client device, as shown at decision block 410. When the authentication information matches with the authentication credentials of the CSF of which the NSD is a part, the NSD can send keep-alive packet to the client device as shown at step 412, and wait for acknowledgement of the keep alive packet from the client device (upstream NSD) as shown at decision block 414. Upon receiving acknowledgement of the keep-alive packet, the CSF connection between the client device (the upstream NSD) and the current NSD can be established, as shown at block 416.

Figure 5:
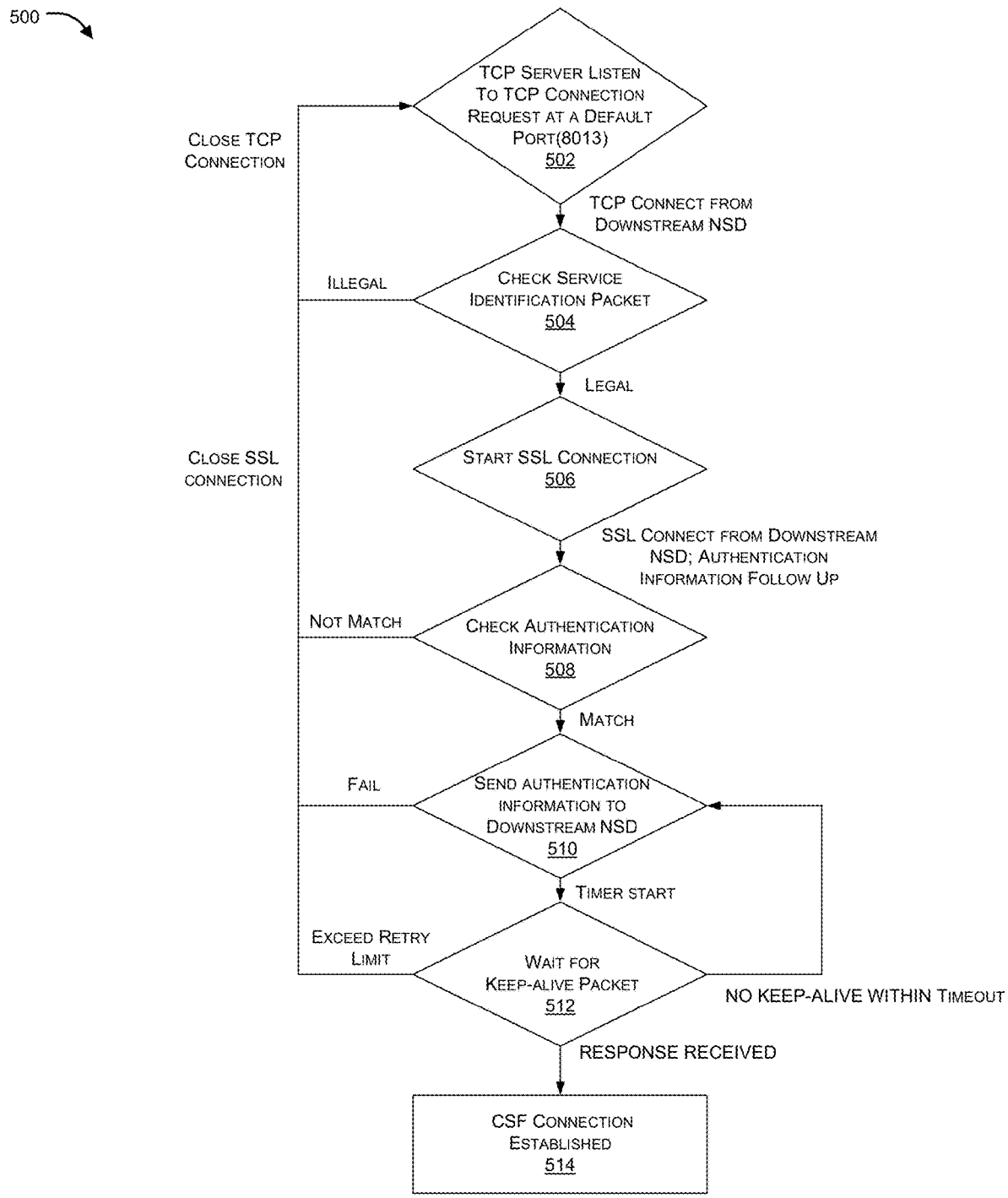
FIG. 5 is a flow diagram illustrating an upstream view of tunnel creation between two NSDs in accordance with an embodiment of the present invention.

FIG. 5 illustrates an exemplary upstream view of tunnel creation between two NSDs in accordance with an embodiment of the present invention. As shown in FIG. 5, a TCP server, for example an NSD can be configured to listen to a TCP connection request from a downstream NSD, on a default port, for example port 8013, as shown block 502. Upon receiving the connection request from the downstream NSD, the NSD can check service identification packet, as shown at block 504, and if the server identification packet is legal, the NSD can start an SSL connection between the downstream NSD and the NSD as shown at block 506. When the service identification packet is illegal, the connection can be closed by the NSD. After starting the SSL connection, the NSD can check if the authentication information received from the downstream NSD matches with the CSF authentication credentials. In an exemplary implementation, if the authentication information provided by the downstream NSD matches with the CSF authentication credentials, the NSD can send its authentication information to the downstream NSD as shown at block 510, and wait for a keep-alive packet, as shown at decision block 512. In an exemplary implementation, the NSD can close the SSL connection and terminate the connection request when a keep-alive packet is not received within a predefined or configurable retry limit. On receiving the keep-alive packet, the NSD can confirm the tunnel as show at block 514.

Figure 6:
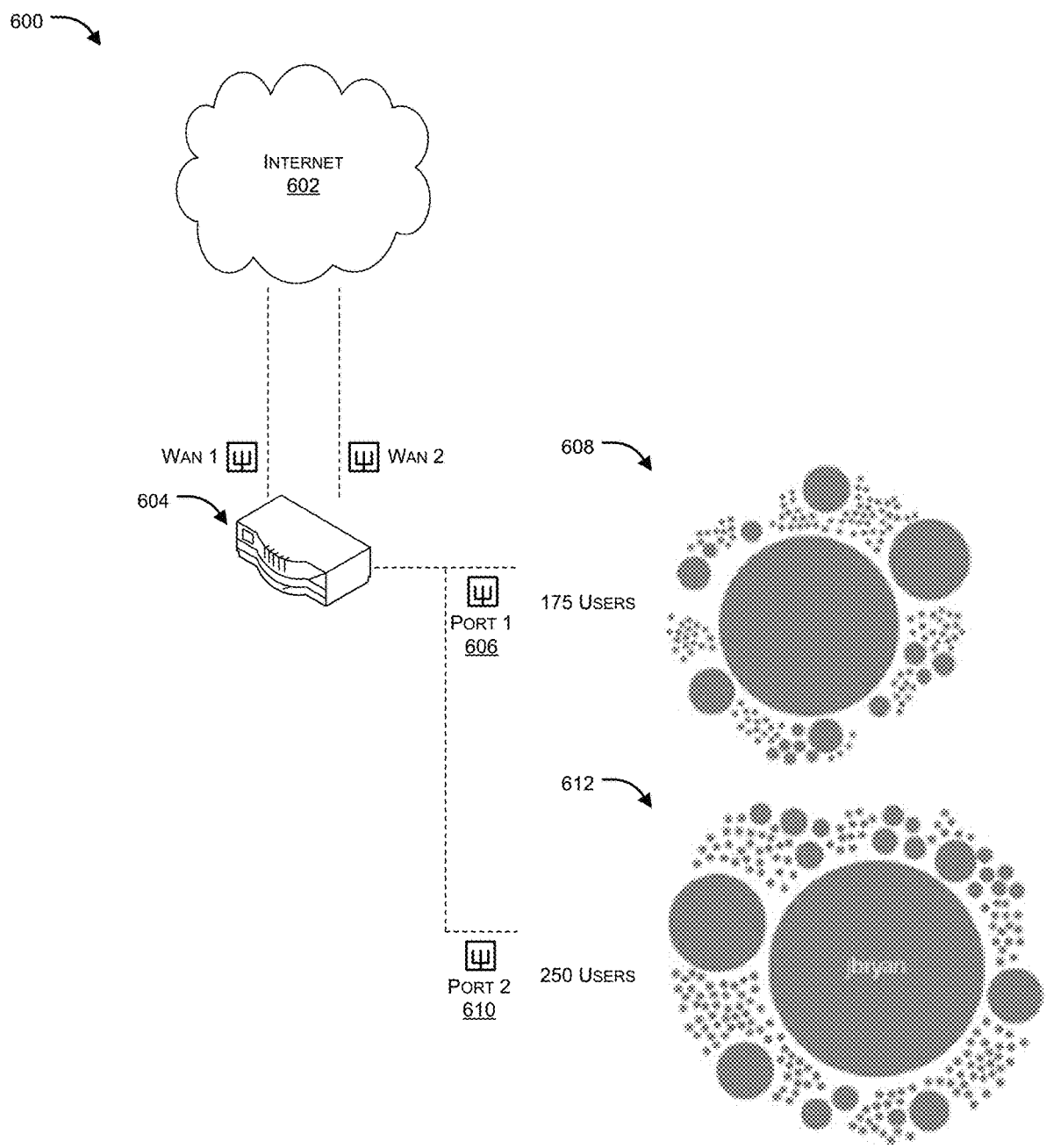
FIG. 6 illustrates a visual representation of NSDs associated with a private network arranged as a CSF in accordance with an embodiment of the present invention.

FIG. 6 illustrates an exemplary visual representation of a plurality of NSDs on a network that is arranged as a CSF in accordance with an embodiment of the present invention. System 200 can be used for creating the CSF, which can be visually represented as shown in FIG. 6. The CSF created by the proposed system can be used for accurately representing the connected NSDs and other network devices within the network protected by NSD 604, shown here as bubble dots. FIG. 6 shows an NSD 604 being connected to Internet 602 at one end, and with a plurality of other NSDs through its different ports such as port 1 606 and port 2 610. Each port may be communicatively coupled to a plurality of network devices. For example, port 1 608 is shown connected to 175 distinct users through various intermediate network devices, and port 2 610 connects to 250 distinct users through some other intermediate network devices. Using the proposed system, as soon as a new network device gets connected with the NSD 604, a new bubble can be created to present the new NSD and similarly when an NSD leaves the CSF, a bubble can be deleted. In an exemplary implementation, a CSF of a plurality of network devices can be created at different levels, for example at a LAN, WAN, MAN level or at a global level.

In an exemplary embodiment, system of the present disclosure can create the CSF and configure each participating NSD to query, configure, and/or perform resource optimization for downstream network devices and/or downstream NSDs.

An embodiment of the present disclosure provides a method for generating a CSF for enabling efficient query, configuration and management of network security devices connected to a particular NSD. In an aspect, the proposed method can include the step of dynamically constructing a CSF based on hierarchical interconnections among multiple NSDs deployed within a protected network by determining a relative position of each of the NSDs within the CSF based on at least one identifier associated with the respective NSDs, wherein each node of the CSF represents a NSD of the multiple NSD and each node of the CSF, except a root node of the CSF and leaf-nodes of the CSF, has one parent node and one or more child nodes, and wherein nodes of the CSF are constrained so as to allow only a parent node to query its child nodes. The proposed method can further include the step of enabling communication of periodic keep-alive messages and on-demand query messages among parent nodes and their respective child nodes by, for each of the plurality of network security devices, establishing, using a daemon running on the network security device, a tunnel between the network security device and each of its child nodes, if any.

Figure 7:
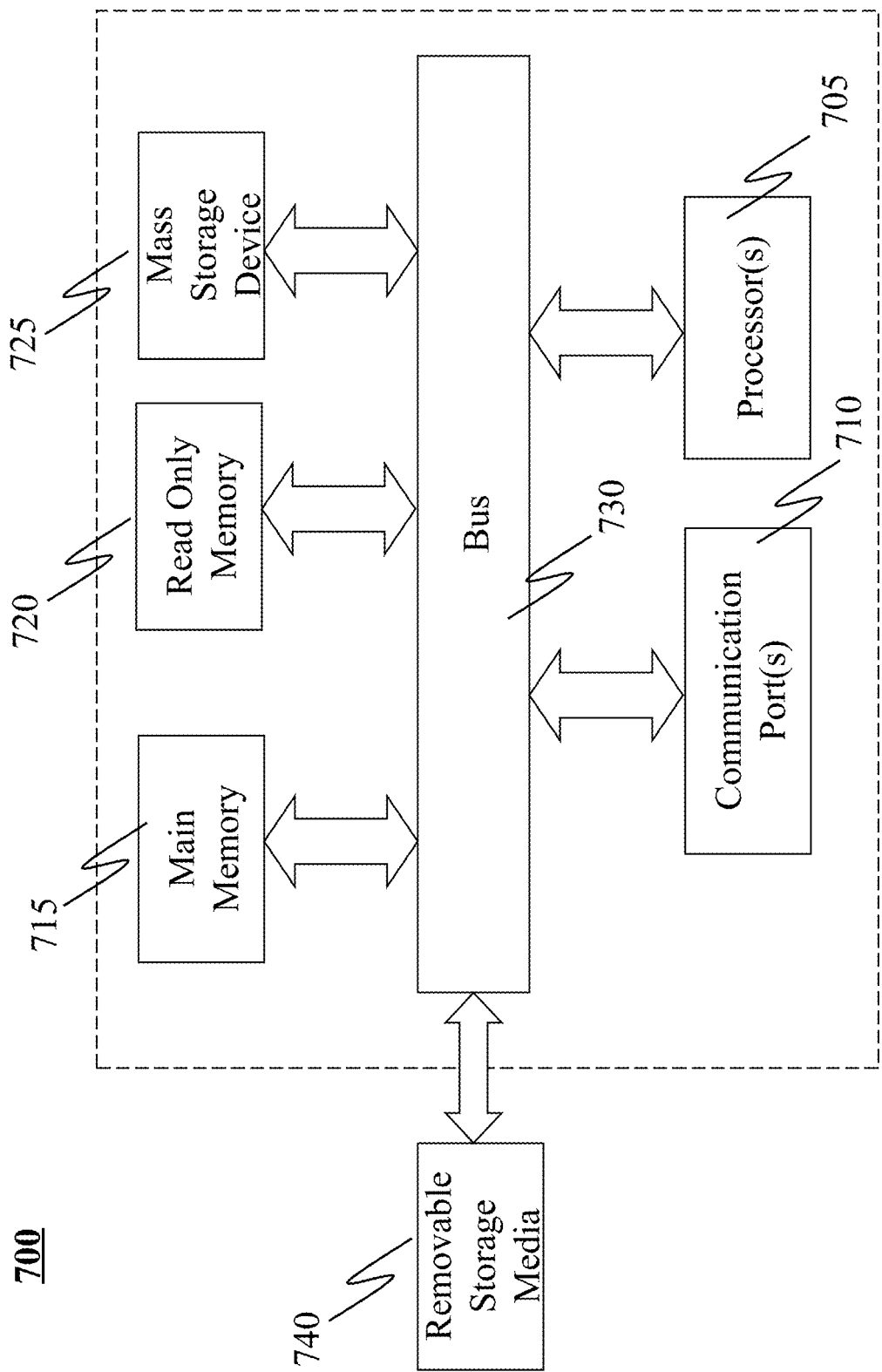
FIG. 7 illustrates an exemplary computer system in which or with which embodiments of the present invention may be utilized.

FIG. 7 is an example of a computer system 700 with which embodiments of the present disclosure may be utilized. Computer system 700 may represent or form a part of an NSD (e.g., NSD 102, 104*a-i*, 200 or 604).

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

What is claimed is:

1. A method comprising:
dynamically constructing a cooperative security fabric (CSF) of a plurality of network security devices deployed within a protected network in a form of a tree, having a plurality of nodes, including a root node, one or more intermediate nodes and one or more leaf nodes, based on hierarchical interconnections among the plurality of network security devices by determining a relative upstream or downstream relationship among each network security device of the plurality of network security devices, wherein each node of a plurality of nodes within the CSF represents a network security device of the plurality of network security devices and each node of the CSF, except the root node and the one or more leaf nodes, includes both a parent node and one or more child nodes;
establishing and maintaining, by backend daemons running within corresponding network security devices of the plurality of network security devices, a bi-directional tunnel between each parent node within the CSF and its respective child nodes through which queries and replies are communicated and through which periodic keep-alive messages and responses are exchanged; and
enforcing, by forward daemons running within each of the plurality of network security devices, a CSF protocol that limits the issuance of query messages to those originated by a source network security device of the plurality of network security devices associated with an upstream node within the CSF and directed to a destination network security device of the plurality of network security devices associated with a downstream node within the CSF.

2. The method of claim 1, wherein the plurality of network security devices comprise gateway devices, firewall devices, Intrusion Detection Systems (IDSs), Intrusion Prevention Systems (IPSs), or Unified Threat Management (UTM) devices.

3. The method of claim 1, wherein, other than the root node, each network security device of the plurality of network security devices participating in the CSF is aware of only those of the plurality of network security devices that are directly connected to it.

4. The method of claim 1, further comprising gathering, by the root node of the CSF, network topology information regarding the CSF by issuing a query to each of one or more child nodes of the root node regarding their respective subtrees.

5. The method of claim 4, wherein the network topology information includes identifying information associated with nodes within the respective subtrees.

6. The method of claim 5, wherein the identifying information includes one or more of an Internet Protocol (IP) address, a Media Access Control (MAC) address and a serial number.

7. The method of claim 4, wherein the network topology information includes information regarding a type, functionality, capabilities and configuration of the nodes within the respective subtrees.

8. The method of claim 1, wherein said dynamically constructing includes the root node identifying itself as such based on having a direct wide area network (WAN) connection.

9. The method of claim 8, wherein said dynamically constructing includes a child node of the plurality network security devices representing a child node of the root node joining the CSF by providing authentication information including a group name of the CSF and a password associated with the CSF.

10. A non-transitory machine readable medium storing instructions executable by a processor of a network security device of a plurality of network security devices deployed within a protected network, the non-transitory machine readable medium comprising instructions to:
dynamically construct a portion of a cooperative security fabric (CSF) of the plurality of network security devices in a form of a tree, having a plurality of nodes, including a root node, one or more intermediate nodes and one or more leaf nodes, based on hierarchical interconnections among the plurality of network security devices by determining a relative upstream or downstream relationship among each network security device of the plurality of network security devices, wherein each node of a plurality of nodes within the CSF represents a particular network security device of the plurality of network security devices and each node of the CSF, except the root node and the one or more leaf nodes, includes both a parent node and one or more child nodes;

establishing and maintaining, by a backend daemon running within the network security device, a first bi-directional tunnel between the network security device and the parent node of the network security device within the CSF through which queries and replies are communicated and through which periodic keep-alive messages and responses are exchanged; and enforcing, by a forward daemon running within the network security device, a CSF protocol that limits the issuance of query messages to those originated by a source network security device of the plurality of network security devices associated with an upstream node within the CSF and directed to a destination network security device of the plurality of network security devices associated with a downstream node within the CSF.

11. The non-transitory machine readable medium of claim 10, wherein the plurality of network security devices comprise gateway devices, firewall devices, Intrusion Detection Systems (IDSs), Intrusion Prevention Systems (IPSs), or Unified Threat Management (UTM) devices.

12. The non-transitory machine readable medium of claim 10, wherein, other than the root node, each network security device of the plurality of network security devices participating in the CSF is aware of only those of the plurality of network security devices that are directly connected to it.

13. The non-transitory machine readable medium of claim 10, further comprising instructions to respond to a query issued by the root node of the CSF network seeking to gather network topology information regarding the CSF by providing information regarding a subtree of the CSF associated with the network security device.

14. The non-transitory machine readable medium of claim 13, wherein the network topology information includes identifying information associated with nodes within the subtree.

15. The non-transitory machine readable medium of claim 14, wherein the identifying information includes one or more of an Internet Protocol (IP) address, a Media Access Control (MAC) address and a serial number.

16. The non-transitory machine readable medium of claim 13, wherein the network topology information includes information regarding a type, functionality, capabilities and configuration of the nodes within the subtree.

17. A network security system comprising:
a processor; and
a non-transitory computer-readable medium, coupled to the processor, having stored therein instructions that when executed by the processor cause the processor to:
dynamically construct a portion of a cooperative security fabric (CSF) of a plurality of network security systems in a form of a tree, having a plurality of nodes, including a root node, one or more intermediate nodes and one or more leaf nodes, based on hierarchical interconnections among the plurality of network security systems by determining a relative upstream or downstream relationship among each network security system of the plurality of network security systems, wherein each node of a plurality of nodes within the CSF represents a particular network security system of the plurality of network security systems and each node of the CSF, except the root node and the one or more leaf nodes, includes both a parent node and one or more child nodes;

establishing and maintaining, by a backend daemon running within the network security system, a first bi-directional tunnel between the network security system and the parent node of the network security system within the CSF through which queries and replies are communicated and through which periodic keep-alive messages and responses are exchanged; and enforcing, by a forward daemon running within the network security system, a CSF protocol that limits the issuance of query messages to those originated by a source network security system of the plurality of network security systems associated with an upstream node within the CSF and directed to a destination network security system of the plurality of network security systems associated with a downstream node within the CSF.

18. The system of claim 17, wherein the plurality of network security systems comprise gateway devices, firewall devices, Intrusion Detection Systems (IDSs), Intrusion Prevention Systems (IPSs), or Unified Threat Management (UTM) devices.

19. The system of claim 17, wherein, other than the root node, each network security system of the plurality of network security systems participating in the CSF is aware of only those of the plurality of network security systems that are directly connected to it.

20. The system of claim 17, wherein the instructions further cause the processor to respond to a query issued by the root node of the CSF network seeking to gather network topology information regarding the CSF by providing information regarding a subtree of the CSF associated with the network security device.

21. The system of claim 20, wherein the network topology information includes identifying information associated with nodes within the subtree.

22. The system of claim 21, wherein the identifying information includes one or more of an Internet Protocol (IP) address, a Media Access Control (MAC) address and a serial number.

23. The system of claim 20, wherein the network topology information includes information regarding a type, functionality, capabilities and configuration of the nodes within the subtree.

* * * * *